Apr. 3, 1923.
A. W. SCHEDE ET AL
1,450,904
WHEEL ATTACHMENT
Filed Nov. 10, 1921
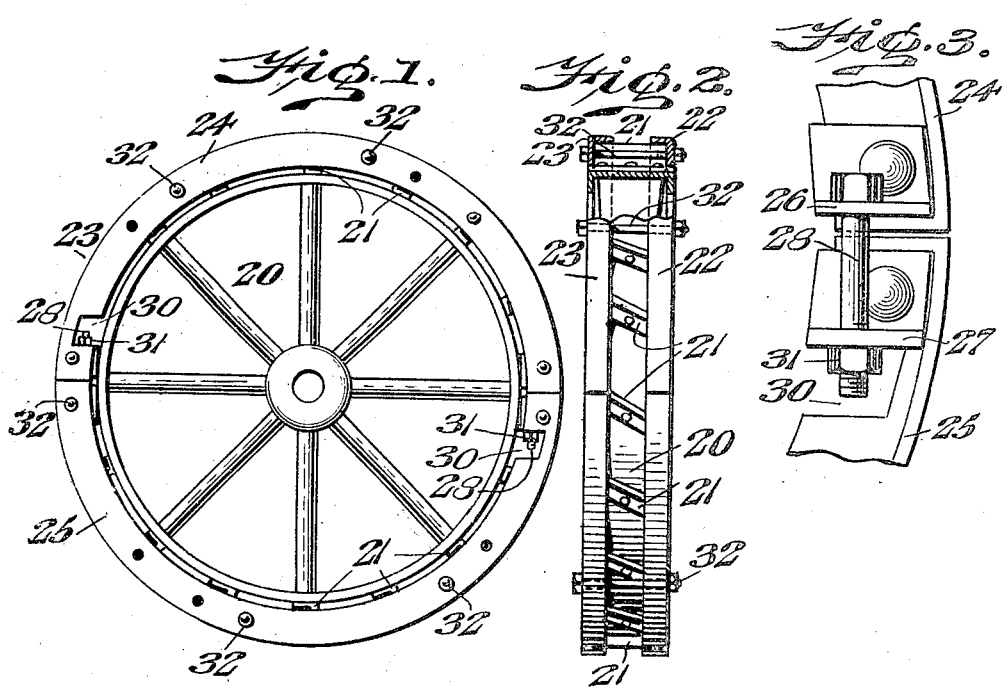
INVENTORS
Albert W. Schede
and John A. Mitchell
BY
Robert M. Carr
ATTORNEY Patented Apr. 3, 1923.

1,450,904

UNITED STATES PATENT OFFICE.

ALBERT W. SCHEDE, OF DREXEL HILL, AND JOHN A. MITCHELL, OF RIDLEY PARK, PENNSYLVANIA.

WHEEL ATTACHMENT.

Application filed November 10, 1921. Serial No. 514,144.

*To all whom it may concern:*

Be it known that we, ALBERT W. SCHEDE and JOHN A. MITCHELL, citizens of the United States, and residents, respectively, of Drexel Hill, county of Delaware, State of Pennsylvania, and Ridley Park, county of Delaware, State of Pennsylvania, have invented certain new and useful Improvements in Wheel Attachments, of which the following is a specification.

Some of the objects of the present invention are to provide an improved removable wheel tread and road protecting cover for wheels having traction producing projections such as grousers, fins or the like; to provide means for readily converting tractor wheels having irregular tractor surfaces into wheels having a smooth surface for use on highways and roads; to provide an attachment for tractor wheels of the Fordson, or any other type whereby a smooth tread surface can be produced without changing the wheels, or jacking up the vehicle to attach or remove such attachment; to provide means for securing a protecting tread surface to a rough surfaced traction wheel whereby the weight of the vehicle is evenly distributed from the tread surface to the wheel proper, and lateral displacement of such surface is prevented; and to provide other improvements as will hereinafter appear.

In the accompanying drawings, Fig. 1 represents a side elevation of the rear traction wheel of a tractor equipped with a protective tread embodying one form of the present invention; Fig. 2 represents an end elevation of the same, partly in section; and Fig. 3 represents a detail of the tread fastening means for the construction shown in Fig. 1.

Referring to the drawings, one form of the invention is shown for use with traction wheels provided with grousers or fins, such as the rear wheel 20 of a Fordson or other tractor having angularly disposed projecting fins 21 arranged about the tread surface of the wheel 20. Such fins 21 serve admirably to increase the tractive effort of the machine in its intended field of work, but become an exceedingly destructive agent if driven over a public roadway.

In order to render traction wheels, of such construction, harmless for road travel one form of the present invention provides two removable tread rings 22 and 23 arranged to be clamped or otherwise made fast to the tread surface of the wheel 21. In the present construction these rings 22 and 23 are each made of relatively heavy rolled steel, of angle section, in two segments 24 and 25. The internal diameter of these ring members is substantially the same as the external diameter of the wheel 20 including the projecting fins 21 and in consequence, when the aforesaid rings 22 and 23 are assembled, each seats circumferentially upon the fins 21 so that they become a part of the wheel 20 and do not carry any more than a proportionate part of the wheel load.

For securing the ring segments 24 and 25 together the respective ends thereof are provided with angle lugs 26 and 27 which are riveted or otherwise made fast to the said segments in such position as to be connected by bolts 28. The side flanges of the ring segments may be cut away, as shown at 30, to give free access to the respective bolt nuts 31.

For the purpose of rigidly securing the rings 22 and 23 together and also to prevent creeping thereof relative to the wheel 20, a plurality of bolts 32 pass transversely of the ring flanges, extending across the periphery of the wheel 20 between the fins 21 and clamp the tread covering in place. It will be noted that the tread surface of each ring is of sufficient width to give an effective bearing surface without cutting into the roadbed, and the two surfaces together provide a relatively wide, smooth tread which takes the place of the irregular gripping tread of the tractor.

From the foregoing it will be evident that in either form of the invention, a complete unitary tread covering is provided, for wheels having projections or other traction devices injurious to roadbeds, whereby such wheels become harmless and can be operated without violating the highway laws for road protection. Furthermore, the entire circumferential length of the attached tread is directly supported by the wheel rim or the wheel fins throughout its length, thereby avoiding crushing or flattening of portions of the tread under the moving load,—in other words the smooth tread member becomes while in place a unitary part of the wheel. Thus, in the present type of tread the respective tread rings distribute the load to the fins 21, while the solid, continuous side flanges resist all tendency to buckle.

By the present invention it becomes unnesessary to purchase or keep on hand a second set of smooth tread tractor wheels to be substituted when the machine is run over improved highways. Nor is it necessary to jack up the tractor wheels to apply the protective tread members because the wheels can be run into one segment of each ring, and then the other ring placed in position and rigidly bolted to the first segment, thus forming a complete tread superposed around and about the ordinary tractor tread.

Furthermore it is unnecessary to prepare the standard tractor wheels in any particular to receive the superposed tread surfaces of the present invention, since either form thereof can be placed in position and assembled in clamped condition for operating purposes without slotting, drilling, cutting or otherwise altering the usual tractor wheel.

While but one form of the present invention has been here shown, it is to be understood that the invention is not limited to its application to any specific construction but might be applied in various ways without departing from the spirit of the invention or the scope of the appended claims.

Having thus described our invention, we claim:

1. In combination, a tractor wheel having a plurality of transversely disposed traction producing fins on the tread surface thereof, a plurality of smooth tread segmental rings of angle section arranged respectively to have one portion thereof seating on said fins and the other portion thereof abutting one end of the respective fins, means for clamping the respective ring segments together, and transverse bolts extending from one ring to the other between said projections for rigidly securing said rings to said fins.

2. In combination a tractor wheel having a plurality of traction producing projections on the tread surface thereof, a pair of smooth tread segmental rings, each having a flange along one edge thereof, said rings being arranged to seat on said projections with said flanges abutting opposite ends respectively of said projections, means for clamping the segments of each ring together, and means for rigidly connecting the rings together with said flanges gripping said projections.

Signed at Philadelphia, in the county of Philadelphia, and State of Pennsylvania, this 31st day of October, 1921.

ALBERT W. SCHEDE.
JOHN A. MITCHELL.